(12) United States Patent
Lu et al.

(10) Patent No.: US 11,643,540 B2
(45) Date of Patent: May 9, 2023

(54) SEEDED EMULSION POLYMERIZATION PROCESS FOR LATEXES AND AQUEOUS INKJET INK COMPOSITIONS MADE THEREFROM

(71) Applicant: Xerox Corporation, Norwalk, CT (US)

(72) Inventors: Chunliang Lu, Webster, NY (US); Valerie Kuykendall, Fairport, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 224 days.

(21) Appl. No.: 17/329,357

(22) Filed: May 25, 2021

(65) Prior Publication Data

US 2022/0380586 A1  Dec. 1, 2022

(51) Int. Cl.
*C08L 25/14* (2006.01)

(52) U.S. Cl.
CPC ........... *C08L 25/14* (2013.01); *C08L 2205/03* (2013.01)

(58) Field of Classification Search
CPC ...... C09D 11/07; C08F 279/00; C08F 265/00; C08F 265/04; C08F 265/06; C08L 25/00
See application file for complete search history.

(56) References Cited

U.S. PATENT DOCUMENTS

| | | | |
|---|---|---|---|
| 9,371,464 B2 | 6/2016 | Breton et al. | |
| 2006/0038867 A1 | 2/2006 | Valentini | |
| 2008/0186373 A1 | 8/2008 | Rolly | |
| 2011/0318551 A1 | 12/2011 | Nakagawa | |
| 2015/0225586 A1 | 8/2015 | Ingle et al. | |
| 2019/0249022 A1 | 8/2019 | Ingle et al. | |
| 2019/0367753 A1 | 12/2019 | Chopra et al. | |
| 2022/0162368 A1 | 5/2022 | Tehrani et al. | |
| 2022/0162462 A1 | 5/2022 | Tehrani et al. | |
| 2022/0306784 A1 * | 9/2022 | Tanaka | C08F 2/30 |

FOREIGN PATENT DOCUMENTS

| | | |
|---|---|---|
| EP | 1609827 A1 | 12/2005 |
| EP | 1108758 B1 | 7/2006 |
| EP | 2823002 B1 | 5/2016 |
| EP | 1756237 B1 | 5/2017 |
| EP | 3494182 B1 | 4/2020 |
| EP | 4001367 A1 | 5/2022 |
| EP | 4001368 A1 | 5/2022 |
| WO | WO2014/042653 | 3/2014 |
| WO | WO2018/143957 | 8/2018 |
| WO | WO2018/143959 | 8/2018 |
| WO | WO2018/143962 | 8/2018 |

OTHER PUBLICATIONS

Extended European Search Report for EP 22170382 dated Oct. 13, 2022; pp. 1-7.

* cited by examiner

*Primary Examiner* — Jeffrey C Mullis
(74) *Attorney, Agent, or Firm* — Bell & Manning, LLC

(57) ABSTRACT

Methods for forming latexes are provided. In embodiments, such a method comprises adding a first portion of a monomer emulsion comprising water, a monomer, an acidic monomer, a multifunctional monomer, and a first reactive surfactant to a reactive surfactant solution comprising water and a second reactive surfactant to form a reaction mixture, wherein the reactive surfactant solution does not comprise monomers other than the second reactive surfactant; adding a first portion of an initiator solution to the reaction mixture so that monomers undergo polymerization reactions to form resin seeds in the reaction mixture; adding a second portion of the monomer emulsion to the reaction mixture comprising the resin seeds; and adding a second portion of the initiator solution to the reaction mixture to form a latex comprising resin particles.

19 Claims, No Drawings

SEEDED EMULSION POLYMERIZATION PROCESS FOR LATEXES AND AQUEOUS INKJET INK COMPOSITIONS MADE THEREFROM

BACKGROUND

Latexes are often used in aqueous inkjet ink compositions in order to bind colorant on substrates and protect printed images. High quality latexes are important to prevent jetting instability, jetting latency, and nozzle clogging during the printing of the aqueous inkjet ink compositions. There are various polymerization processes used to produce latexes for aqueous inkjet ink compositions. Despite this, it has been challenging to both produce the latexes quickly and efficiently without sacrificing quality.

SUMMARY

The present disclosure provides methods for forming latexes for use in various applications such as binders in aqueous inkjet ink compositions. Embodiments of the methods provide improved control over the emulsification and polymerization process so as to reliably achieve resin particles having a small size and narrow size distribution. This contributes to the high quality of the resulting latexes. Embodiments of the methods require fewer components (e.g., no surfactant) and/or smaller amounts of components (e.g., less initiator) while producing the latexes very quickly (e.g., less than 5 hours). Embodiments of the resulting latexes are highly stable and also have tunable glass transition temperatures $T_g$. $T_g$ values may be achieved which are sufficiently low so as to achieve coalescence of an aqueous inkjet ink composition comprising the resin particles at room temperature (i.e., 20° C. to 25° C.). The latexes and aqueous inkjet ink compositions are also encompassed by the present disclosure.

In one aspect, methods forming latexes are provided. In embodiments, such a method comprises adding a first portion of a monomer emulsion comprising water, a monomer, an acidic monomer, a multifunctional monomer, and a first reactive surfactant to a reactive surfactant solution comprising water and a second reactive surfactant to form a reaction mixture, wherein the reactive surfactant solution does not comprise monomers other than the second reactive surfactant; adding a first portion of an initiator solution to the reaction mixture so that monomers undergo polymerization reactions to form resin seeds in the reaction mixture; adding a second portion of the monomer emulsion to the reaction mixture comprising the resin seeds; and adding a second portion of the initiator solution to the reaction mixture to form a latex comprising resin particles.

In another aspect, latexes are provided. In embodiments, such a latex comprises resin particles comprising a polymerization product of reactants comprising a monomer other than styrene, an acidic monomer, a multifunctional monomer, and a reactive surfactant, the resin particles having a $D_{50}$ particle size of no greater than about 100 nm, a $D_{90}$ particle size of less than about 150 nm, and a width of no greater than about 45 nm.

Other principal features and advantages of the disclosure will become apparent to those skilled in the art upon review of the following drawings, the detailed description, and the appended claims.

DETAILED DESCRIPTION

Latex

In one aspect, methods for forming a latex are provided. The resin particles of the latex are synthesized from various monomers to form a polymeric material from which the resin particles are composed. The types of monomers, and hence, polymeric material, are not particularly limited. However, by way of illustration, the following monomers and combinations thereof may be used (use of "(meth)" as in, e.g., "(meth)acrylate", refers to both acrylate and methacrylate): styrene; alkyl (meth)acrylates, such as, methyl acrylate, ethyl acrylate, butyl acrylate, isobutyl acrylate, dodecyl acrylate, n-octyl acrylate, 2-chloroethyl acrylate, methyl methacrylate, ethyl methacrylate and butyl methacrylate; β-carboxy ethyl acrylate (β-CEA), phenyl acrylate, methyl alphachloroacrylate; butadiene; isoprene; methacrylonitrile; acrylonitrile; vinyl ethers, such as vinyl methyl ether, vinyl isobutyl ether, and vinyl ethyl ether; vinyl esters, such as vinyl acetate, vinyl propionate, vinyl benzoate and vinyl butyrate; vinyl ketones, such as vinyl methyl ketone, vinyl hexyl ketone and methyl isopropenyl ketone; vinylidene halides, such as vinylidene chloride and vinylidene chlorofluoride; N-vinyl indole; N-vinyl pyrrolidone; methacrylate; acrylamide; methacrylamide; vinylpyridine; vinylpyrrolidone; vinyl-N-methylpyridinium chloride; vinyl naphthalene; p-chlorostyrene; vinyl chloride; vinyl bromide; vinyl fluoride; ethylene; propylene; butylenes; and isobutylene. In embodiments, the monomers used to form the resin particles of the latex comprise a styrene and an alkyl acrylate. In embodiments, the monomers used to form the resin particles of the latex comprise two different alkyl acrylates (e.g., methyl (meth)acrylate and butyl (meth)acrylate). In some embodiments, styrene is not used. Use of alkyl acrylates and eliminating styrene is useful to provide latexes which facilitate film formation and coalescence of aqueous inkjet ink compositions comprising the latexes.

In embodiments in which the monomers comprise either styrene/alkyl acrylate or two different alkyl acrylates, the weight ratio of the different monomers may be adjusted to achieve a desired $T_g$, including values of $T_g$ within the ranges described below. In embodiments, the weight ratio of (styrene):(alkyl acrylate) is from 10:1 to 1:1, from 8:1 to 2:1, and from 7:1 to 3:1. In embodiments, the weight ratio of a first alkyl acrylate (e.g., methyl (meth)acrylate): a second alkyl acrylate (e.g., butyl (meth)acrylate) is from 5:1 to 1:5, from 3:1 to 1:3, and from 2:1 to 1:2. These weight ratios refer to the ratio of the weights of each monomer in a monomer emulsion from which the resin particles are formed. They also refer to the ratio of the weights of each monomer in the resin particles, since it was determined that conversion of the monomers in the present methods is above 99.9%.

Acidic monomers may be used to form the resin particles of the latex, including (meth)acrylic acid monomers, sulfonic acid monomers, sulfonate monomers, and combinations thereof. Illustrative acidic monomers include acrylic acid, methacrylic acid, ethacrylic acid, dimethylacrylic acid, maleic anhydride, maleic acid, styrenesulfonic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. These acidic monomers also encompass salts thereof, e.g., salt of a sulfonic acid.

In embodiments, two different acidic monomers are used to form the resin particles of the latex, each having a different $pK_a$ value. The $pK_a$ values of the two different acidic monomers may differ from one another by at least 2 units, at least 3 units, at least 4 units, or at least 5 units. In embodiments, the two different acidic monomers are present in a monomer emulsion used to form the resin particles at a weight ratio of acidic monomer having a higher $pK_a$ to acidic monomer having a lower $pK_a$ in a range of from 0.1 to 10. This includes a range of from 0.5 to 8 and from 1 to 6. In embodiments, the two different types of acidic monomers used to form the resin particles comprise a methacrylic acid and a sulfonic acid.

Hydrophilic monomers may be used to form the resin particles of the latex. The term "hydrophilic monomer" is distinguished from the "acidic monomers" described above. That is, although the selected acidic monomers may also be hydrophilic, these terms refer to different, chemically distinct species of monomers. The hydrophilic monomers are useful to improve freeze-thaw stability of latexes formed therefrom as well as the latency of aqueous inkjet ink compositions. The hydrophilic monomers are generally monofunctional, i.e., comprising a single polymerizable group. Illustrative hydrophilic monomers include hydroxyethyl (meth)acrylate, n-hydroxyethyl (meth)acrylamide, hydroxypropyl (metha)crylate, and hydroxypropyl (meth)acrylamide, ethylene glycol (meth)acrylate, propylene glycol (meth)acrylate, poly(ethylene glycol) (meth)acrylate having a molecular weight from 200 g/mol to 2000 g/mol, and poly(propylene glycol) (meth)acrylate having a molecular weight from 200 g/mol to 2000 g/mol, and combinations thereof. In both cases, this includes a molecular weight from 500 g/mol to 1000 g/mol. These molecular weights may be determined using gel permeation chromatography (GPC). In embodiments, the hydrophilic monomers used to form the resin particles comprise a poly(ethylene glycol) methacrylate.

Multifunctional monomers may be used to form the resin particles of the latex, i.e., those comprising more than one polymerizable group (e.g., 2, 3, 4). These are useful as they facilitate crosslinking within the resin particles. Illustrative multifunctional monomers include difunctional monomers such as a poly(ethylene glycol) di(meth)acrylate, e.g., poly(ethylene glycol) diacrylate having a molecular weight from 200 g/mol to 2000 g/mol. These difunctional monomers may also be considered to be hydrophilic as noted above. Other hydrophilic difunctional monomers include a diacrylate compound bonded with an alkyl chain containing an ether bond, such as diethylene glycol diacrylate, triethylene glycol diacrylate, tetraethylene glycol diacrylate, polyethylene glycol #400 diacrylate, polyethylene glycol #600 diacrylate, dipropylene glycol diacrylate, and compounds obtained by substituting acrylate of these compounds with methacrylate; a diacrylate compound bonded with a chain containing an aromatic group and an ether bond, such as polyoxyethylene(2)-2,2-bis(4-hydroxyphenyl)propane diacrylate, polyoxyethylene(4)-2,2-bis(4-hydroxyphenyl)propane diacrylate, and compounds obtained by substituting acrylate of these compounds with methacrylate. Other illustrative difunctional monomers include a diene compound, such as isoprene and butadiene, an aromatic divinyl compound, such as divinylbenzene and divinylnaphthalene; a diacrylate compound bonded with an alkyl chain, such as ethylene glycol diacrylate, 1,3-butylene glycol diacrylate, 1,4-butanediol diacrylate, 1,5-pentanediol diacrylate, 1,6-hexanediol diacrylate, 1,10-dodecanediol diacrylate, neopentyl glycol diacrylate, and compounds obtained by substituting acrylate of these compounds with methacrylate. Multifunctional monomers include such as pentaerythritol triacrylate, trimethylolmethane triacrylate, trimethylolpropane triacrylate, tetramethylolmethane tetraacrylate, oligoester acrylate, and compounds obtained by substituting acrylate of these compounds with methacrylate.

Reactive surfactants may be used to form the resin particles of the latex. Suitable reactive surfactants comprise a polymerizable (and thus, reactive) group such that they become incorporated into the resin particles. Illustrative reactive surfactants include anionic ether sulfate reactive surfactants such as those in the commercially available Hitenol BC series such as Hitenol BC10-25. Other suitable reactive surfactants include polyoxyethylene alkylphenyl ether ammonium sulfate, Hitenol BC-10, BC-20, BC-2020, BC-30; polyoxyethylene styrenated phenyl ether ammonium sulfate including Hitenol AR-10, AR-20, AR10-25, AR-2020; non-ionic polyoxyethylene alkylphenyl ether including Noigen RN-10, RN-20, RN-30, RN-40, RN-5065; and reactive surfactant available from Ethox including E-sperse RX-201, RX-202, RX-203, RS-1596, RS-1616, RS-1617, RS-1618, RS-1684.

A chain transfer agent may be used to form the latex. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In forming the latex, any of the monomers described above may be used in a monomer emulsion comprising a solvent. Water is generally used as the solvent, but water-soluble or water-miscible organic solvents (e.g., ethanol) may also be included. The type of monomers and their relative amounts may be selected to tune the properties of the resin particles/latex.

Acidic monomers may be used in the monomer emulsion in an amount in a range of from 1.5 weight % to 15 weight %. (Here, weight % refers to the (total weight of acidic monomers)/(total weight of monomers in the monomer emulsion, excluding the reactive surfactants)*100). This range includes from 5 weight % to 10 weight %. As noted above, two different types of acidic monomers having different $pK_a$ values may be used in the weight ratios described above. Hydrophilic monomers may be used in the monomer emulsion in an amount in a range of from 0 weight % to 10 weight %. (Weight % has a meaning analogous to that described for acidic monomers.) This range includes from 0.1 weight % to 8% weight % and from 1 weight % to 8 weight %. Multifunctional monomers, including difunctional monomers, may be used in the monomer emulsion in an amount in a range of from 0.01 to 5 weight %, from 0.1 weight % to 5 weight %, or from 0.1 weight % to 1 weight %. (Weight % has a meaning analogous to that described for acidic monomers.) Other monomers, (e.g., styrenes, alkyl acrylates) may be present in an amount in a range of from 70 weight % to 97 weight %. (Weight % has a meaning analogous to that described for acidic monomers.) This range includes from 75 weight % to 90 weight %. As noted above, these monomers may be used in the weight ratios described above.

Together, the amount of acidic monomers, hydrophilic monomers, and multifunctional monomers (e.g., hydrophilic multifunctional monomers) may be present in the monomer emulsion in a range of from 1.5 weight % to 20 weight %. (Here, weight % refers to the (total weight of acidic monomers, hydrophilic monomers, and multifunctional monomers)/(total weight of monomers in the monomer emulsion, excluding the reactive surfactants)*100.) This range includes from 2 weight % to 20 weight %, and from 5 weight % to 20 weight %.

Reactive surfactants may be used in the monomer emulsion an amount in a range of from 1.5 weight % to 6.5 weight %. (Here, weight % refers to the (total weight of reactive surfactants)/(total weight of monomers in the monomer emulsion, including the reactive surfactant monomers) *100.) This range includes from 1.5 weight % to 5 weight %.

The chain transfer agent(s) may be present in the monomer emulsion and may be used in various suitable amounts, for example, from about 0.25 weight % to about 2.5 weight %. (Here, weight % refers to the (total weight of chain transfer agents)/(total weight of monomers in the monomer emulsion, excluding the reactive surfactants)*100.)

In embodiments, the monomer emulsion comprises (or consists of) a solvent (e.g., water), a styrene, an alkyl acrylate (e.g., butyl acrylate), an acidic monomer, a multifunctional monomer (e.g., a difunctional monomer), and a reactive surfactant. In such embodiments, one type or different types of the various monomers may be used. Similarly, one type or different types of the solvent may be used. In embodiments, the monomer emulsion comprises (or consists of) a solvent (e.g., water), a styrene, an alkyl acrylate (e.g., butyl acrylate), two different types of acidic monomers (e.g., a methacrylic acid and a sulfonic acid), a difunctional monomer (e.g., a poly(ethylene glycol) diacrylate), and a reactive surfactant. In embodiments, the monomer emulsion comprises (or consists of) a solvent (e.g., water), a first alkyl acrylate (e.g., methyl methacrylate), a second alkyl acrylate (e.g., butyl acrylate), an acidic monomer, a multifunctional monomer (e.g., a difunctional monomer), and a reactive surfactant. In such embodiments, one type or different types of the various monomers may be used. Similarly, one type or different types of the solvent may be used. In embodiments, the monomer emulsion comprises (or consists of) a solvent (e.g., water), a first alkyl acrylate (e.g., methyl methacrylate), a second alkyl acrylate (e.g., butyl acrylate), two different types of acidic monomers (e.g., a methacrylic acid and a sulfonic acid), a difunctional monomer (e.g., a poly(ethylene glycol) diacrylate), and a reactive surfactant. In any of these embodiments, a hydrophilic monomer may be included (e.g., a poly(ethylene glycol) methacrylate. In any of these embodiments, a chain transfer agent may be included. In any of these embodiments, amounts of the various monomers and chain transfer agents may be used as described above. The balance may be made up of the solvent.

In at least some embodiments, the monomer emulsion is free of (i.e., does not comprise) a styrene.

At least in embodiments, the monomer emulsion is free of (i.e., does not comprise) a surfactant. Here, "surfactant" refers to non-reactive, non-polymerizable anionic surfactants such as sodium dodecylsulfate (SDS), sodium dodecylbenzene sulfonate, sodium dodecylnaphthalene sulfate; dialkyl benzenealkyl sulfates; palmitic acid; alkyldiphenyloxide disulfonate; and branched sodium dodecyl benzene sulfonate. "Surfactant" also refers to non-reactive, non-polymerizable cationic surfactants such as alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, and dodecylbenzyl triethyl ammonium chlorides. "Surfactant" also refers to non-reactive, non-polymerizable nonionic surfactants such as polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly (ethyleneoxy) ethanol, and block copolymer of polyethylene oxide and polypropylene oxide. Thus, the monomer emulsion may be free of (i.e., does not comprise) any of these surfactants.

Processing steps for forming the latexes comprise adding a first portion of any of the monomer emulsions described above to a reactive surfactant solution at a feed rate over a period of time. The first portion of the monomer emulsion that is added to the reactive surfactant solution refers to a portion of a total amount of the monomer emulsion being used in the method to form the latex. This first portion may be an amount that is in a range of from 1% to 20% by volume of a total amount of the monomer emulsion. This includes from 2% to 15% by volume and from 5% to 10% by volume. As described below, a remaining portion of the monomer emulsion is used in later steps of the method. The feed rate that the first portion of the monomer emulsion is added may be in a range of from 1 mL/min to 10 mL/min based on a total reaction volume of 1 L. The period of time over which the first portion of the monomer emulsion is added may be in in a range of from 5 minutes to 100 minutes.

The reactive surfactant solution comprises a solvent and a reactive surfactant. Any of the solvents and any of the reactive surfactants described above may be used. One type or different types of solvent and/or reactive surfactants may be used. The reactive surfactant in the reactive surfactant solution may be the same type or a different type as compared to a reactive surfactant that may be present in the monomer emulsion. The reactive surfactant solution may further comprise a buffer. Various buffers may be used such as sodium bicarbonate, sodium carbonate, and ammonium hydroxide. The reactive surfactant may be used in an amount in a range of from 1 weight % to 10 weight %. (Here, weight % refers to the (total weight of reactive surfactants)/(total weight of reactive surfactant solution)*100.) This range includes from 2 weight % to 5 weight %. The buffer may be used in an amount in a range of from 0.25 weight % to 2.5 weight %. (Weight % has a meaning analogous to that described above.)

In embodiments, the reactive surfactant solution comprises (or consists of) a solvent (e.g., water), a reactive surfactant, and optionally, a buffer. In such embodiments, one type or different types of these components may be used. In any of these embodiments, amounts of the reactive surfactants and buffer may be used as described above. The balance may be made up of the solvent. At least in some embodiments, the reactive surfactant solution is free of (i.e., does not comprise) any of the surfactants described above. In at least some embodiments, the reactive surfactant solution is free of (i.e., does not comprise) any monomers, other than the reactive surfactant monomer(s) present in the solution. In at least some embodiments, the reactive surfactant solution is free of (i.e., does not comprise) an initiator.

The addition of the first portion of the monomer emulsion to the reactive surfactant solution may be carried out under an inert gas (e.g., nitrogen) and at an elevated temperature (e.g., greater than room temperature such as a temperature in a range of from 50° C. to 90° C.). This may be accomplished by purging with the inert gas and heating the reactive surfactant solution prior to the addition of the first portion of the monomer emulsion and continuing during the addition of the first portion of the monomer emulsion.

Next, a first portion of an initiator solution is added to the combined first portion of the monomer emulsion/reactive surfactant solution (i.e., the "reaction mixture") at a feed rate over a period of time. The first portion of the initiator solution that is added to the reaction mixture refers to a portion of a total amount of the initiator solution being used in the method to form the latex. This first portion may be an amount that is in a range of from 10% to 90% by volume of a total amount of the initiator solution. This includes from 12% to 85% by volume and from 15% to 75% by volume. As described below, a remaining portion of the initiator solution is used in later steps of the method. This feed rate may be in a range of from 1 mL/min to 10 mL/min based on a total reaction volume of 1 L. The period of time over which the initiator solution is added may be in in a range of from 0.1 min to 10 min, from 0.5 min to 5 min, and from 0.5 min to 3 min. The addition of the initiator solution may be carried out at the elevated temperature and under inert gas as described above. In the presence of the initiator, the monomers of the monomer emulsion undergo polymerization reactions to form resin seeds in the reaction mixture.

The initiator solution comprises an initiator and any of the solvents described above. One type or different types of solvent and/or initiators may be used. Examples of suitable initiators include water soluble initiators, such as ammonium persulfate (APS), sodium persulfate and potassium persulfate; and organic soluble initiators including organic peroxides and azo compounds including Vazo peroxides, such as VAZO 64™, 2-methyl 2-2'-azobis propanenitrile, VAZO 88™, 2-2'-azobis isobutyramide dehydrate; and combinations thereof. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methyl-propionamidine]dihydrochloride, 2,2'-azobis[N-(4-amino-phenyl)-2-methylpropionamidine]tetrahydrochloride, 2,2'-azobis[2-methyl-N-(phenylmethyl)propionamidine]dihydrochloride, 2,2'-azobis[2-methyl-N-2-propenyl-propionamidine]dihydrochloride, 2,2'-azobis[N-(2-hydroxy-ethyl)2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochlo-ride, 2,2'-azobis[2-(5-hydroxy-3,4,5,6-tetrahydropyrimidin-2-yl)propane]dihydrochloride, 2,2'-azobis {2-[1-(2-hydroxyethyl)-2-imidazolin-2-yl]propane}dihydrochloride, and combinations thereof. The initiator may be used in an amount in a range of from 0.1 weight % to 2.5 weight %. (Here, weight % refers to the (total weight of initiators)/(total weight of initiator solution)*100.)

Next, a second portion of the monomer emulsion is added to the reaction mixture, now comprising the resin seeds, at a feed rate over a period of time. The amount of this second portion may be the remainder of the total amount of the monomer emulsion being used in the method to form the latex. This feed rate and period of time may be within the ranges described above for the first portion, but they need not be the same as those used for the first portion. The addition of the second portion may be carried out at the elevated temperature and under inert gas as described above.

A second portion of the initiator solution is also added to the reaction mixture. The amount of this second portion may be the remainder of the total amount of the initiator solution being used in the method to form the latex. The second portion of the initiator solution may be added either intermittently (i.e., in discrete portions) or continuously (i.e., at a feed rate) during the addition of the second portion of the monomer emulsion described above. These embodiments involving the apportionment of the initiator solution can significantly reduce the total amount of initiator required or total reaction time required to achieve resin particles having a desired size. Alternatively, the second portion of the initiator solution may be added at a feed rate and period of time, but after the addition of the second portion of the monomer solution is completed. In this case, the feed rate and period of time may be within the ranges described above for the addition of the first portion of the initiator solution, but they need not be the same. The addition of the second portion of initiator solution may be carried out at the elevated temperature and under inert gas as described above.

The addition of the second portion of the monomer emulsion and the addition of the additional amount of initiator solution enables further polymerization reactions between monomers to grow the resin seeds into the resin particles of the latex.

"Hold" periods may be included between any of the steps described above, i.e., periods of time in which the reaction mixture is simply held at the desired temperature (e.g., the elevated temperature) without adding any components. These periods of time may be in a range of from 1 minute to 2 hours, including from 1 minute to 1 hour, and from 1 minute to 20 minutes. The method may comprise a final hold, e.g., from in a range of from 1 hour to 5 hours or from 1 hour to 3 hours. The temperature used at for the final hold may be higher than that used during other steps of the method, including higher than the elevated temperature. This temperature in the final hold may be in a range of from 70° C. to 100° C. or from 75° C. to 95° C.

The result of the steps described above is a latex comprising resin particles. Optionally, the latex formed may be processed by standard techniques such as coagulation, dissolution and precipitation, filtering, washing, or drying.

It is noted that, at least in embodiments, the present methods do not involve the use of any of the surfactants (other than the reactive surfactant monomers) described above.

The present methods may further comprise forming the monomer emulsion, forming the reactive surfactant solution, and/or forming the initiator solution. Each may be formed by combining the desired components at the desired amounts and mixing.

As noted above, the latex formed by the present methods comprises resin particles. The composition of the resin particles depends upon the selection of the monomers and their relative amounts, as well as the polymerization reactions between selected monomers that produce a polymerization product as described above. Thus, a variety of compositions are encompassed, including those based on various polymerization products of reactants comprising various combinations of monomers. As noted above, the selection of monomers is not particularly limited. However, in embodiments, the resin particles comprise (or consist of) the polymerization product (e.g., a copolymer) of reactants comprising a styrene, an alkyl acrylate (e.g., butyl acrylate), an acidic monomer, a multifunctional monomer (e.g., a difunctional monomer), and a reactive surfactant. In such embodiments, one type or different types of the various monomers may be present. In embodiments, the resin particles comprise (or consist of) the polymerization product of a reactants comprising a styrene, an alkyl acrylate (e.g., butyl acrylate), two different types of acidic monomers (e.g., a methacrylic acid and a sulfonic acid), a difunctional monomer (e.g., a poly(ethylene glycol) diacrylate), and a reactive surfactant. In embodiments, the resin particles comprise (or consist of) the polymerization product of reactants comprising a first alkyl acrylate (e.g., methyl methacrylate), a second alkyl acrylate (e.g., butyl acrylate), an acidic monomer, a multifunctional monomer (e.g., a difunctional monomer), and a reactive surfactant. In embodiments, the resin particles comprise (or consist of) the polymerization product of reactants comprising a first alkyl acrylate (e.g., methyl methacrylate), a second alkyl acrylate (e.g., butyl acrylate), two different types of acidic monomers (e.g., a methacrylic acid and a sulfonic acid), a difunctional monomer (e.g., a poly(ethylene glycol) diacrylate), and a reactive surfactant. In each of these embodiments, the reactants may include a hydrophilic monomer, e.g., a poly(ethylene glycol) methacrylate. In each of these embodiments, an initiator may be incorporated at the beginning and end of each polymer chain in the resin particles. In each of these embodiments, the resin may be crosslinked due to the multifunctional/difunctional monomer. In each of these embodiments, the monomers may be present in the resin particles in the amounts described above. For example, together, the amount of the acidic monomer, the hydrophilic monomer, and the multifunctional monomer, may be in a range of from 1.5 weight % to 20 weight % in the resin particles. As above, this weight % refers to the (total weight of acidic monomers, hydrophilic monomers, and multifunctional monomers)/(total weight of monomers in the resin particles, excluding the reactive surfactants)*100.

The resin particles of the present latexes may be characterized by their size. The size of the resin particles may be reported as a $D_{50}$ particle size, which refers to a diameter at which 50% of the sample (on a volume basis) is comprised of particles having a diameter less than said diameter value. The $D_{50}$ particle size may be measured using a Malvern Zetasizer Nano ZS. This instrument uses a laser light-scattering technique, in which Doppler-shifted light generated from each particle in motion (Brownian motion) is measured. The signals generated by these shifts are proportional to the size of the particles. The signals are mathematically converted to particle size and size distribution. The analysis can be performed using an external probe or by inserting the probe into a fixed sample chamber. In embodiments, the $D_{50}$ particle size is no greater than 100 nm, no greater than 90 nm, no greater than 80 nm, no greater than 75 nm, or in a range of from 40 nm to 100 nm or from 50 nm to 80 nm.

Similarly, the resin particles of the present latexes may be characterized by their size distribution. The size distribution may be reported as a width of the peak measured using the nanoparticle analyzer. In embodiments, the width is no greater than 45 nm, no greater than 40 nm, no greater than 35 nm, or in a range of from 25 nm to 35 nm.

Due to their small size and narrow size distribution, the resin particles of the present latexes may further be characterized as being free of (i.e., not comprising) large particles. This may be evidenced by a $D_{95}$ value of less than 150 nm, less than 125 nm, or less than 100 nm. The $D_{95}$ value which refers to a diameter at which 95% of the sample (on a volume basis) is comprised of particles having a diameter less than said diameter value. Again, the Malvern Zetasizer Nano ZS may be used to measure the $D_{95}$ value.

The present latexes may also be characterized by their $T_g$ values, which may be measured using a Differential Scanning calorimetry (DSC) instrument. In embodiments, the $T_g$ is in a range of from 20° C. to 100° C. This includes a range of from 35° C. to 80° C., from 50° C. to 80° C., from 20° C. to 50° C., and from 25° C. to 45° C.

Aqueous Inkjet Ink Compositions

Any of the latexes described above may be used to provide an aqueous inkjet ink composition. The resin particles may be present in the aqueous inkjet ink composition in an amount in a range of from 1 weight % to 10 weight %. (Here, weight % refers to the (total weight of the resin particles))/(total weight of aqueous inkjet ink composition) *100.) This range includes from 5 weight % to 10 weight %. A variety of other components may be used to form the aqueous inkjet ink compositions as described below.

Solvent System

The aqueous inkjet ink compositions comprise a solvent system based on water. The solvent system can consist solely of water, or can comprise a mixture of water and a water-soluble and/or water-miscible organic solvent. The water-soluble and water-miscible organic solvents may be referred to herein as a co-solvent or a humectant. Suitable such organic solvents include alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, and ethoxylated glycerol. Illustrative examples include ethylene glycol, propylene glycol, diethylene glycols, glycerine, dipropylene glycols, trimethylolpropane, 1,2-hexanediol, 1,5-pentanediol, 2-methyl-1,3-propanediol, 2-ethyl-2-hydroxymethyl-1,3-propanediol, 3-methoxybutanol, 3-methyl-1,5-pentanediol, 1,3-propanediol, 1,4-butanediol, and 2,4-heptanediol. Other suitable solvents include amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxypropionic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, and substituted and unsubstituted acetamides. Combinations of these organic solvents may be used.

Suitable water-soluble and/or water-miscible organic solvents include a glycol of hydrocarbons having a carbon number of 4 to 7. Examples of such a glycol include 1,2-pentane diol; 1,2-hexanediol; 1,5-pentanediol; 1,6-hexanediol; 3-methyl-1,3-butanediol; 1,2-butanediol; 2,4-pentanediol; 1,7-heptanediol; 3-methyl-1,5-pentanediol; trimethylolpropane; ethyleneurea; 1,2,6-hexantriol; 1,2,3-butanetriol; sorbitol; urea; diethylene glycol; 1,2,4-butanetriol; glycerol; diglycerol; triethylene glycol; polyethylene glycol 200; and polyethylene glycol 600.

In embodiments, the solvent system comprises water, a 1,2-alcohol (e.g., 1,2-hexanediol), a glycol (e.g., propylene glycol), and a glycerol.

In solvent systems comprising water and an organic solvent, the water to organic solvent weight ratio, as well as the type and relative amount of different organic solvents, may be selected to achieve certain properties for the aqueous inkjet ink composition such as a desired surface tension, viscosity, etc. In embodiments, the water to organic solvent weight ratio is from 90:10 to 51:49. If more than one organic solvent is used, these weight ratios refer to the total amount of organic solvent. As water may be present in the latex, colorant, etc., these weight ratios refer to the total amount of water.

Similarly, various total amounts of the solvent system may be used in the aqueous inkjet ink compositions. In embodiments, the solvent system is present in an amount of from 50 weight % to 95 weight %, from 60 weight % to 90 weight %, or from 65 weight % to 90 weight %. (Here, weight % refers to the (total weight of solvent system)/(total weight of aqueous inkjet ink composition)*100.) In embodiments, the total amount of water present is at least 50 weight %, at least 60 weight %, at least 80 weight %, or in a range of from 50 weight % to 95 weight %. (Here, weight % refers to the (total weight of water)/(total weight of aqueous inkjet ink composition)*100.)

Water-Soluble Resin

A water-soluble resin may be used in the aqueous inkjet ink composition, although in some embodiments, no water-soluble resin is used. The type and the amount may be also selected to achieve a desired viscosity. Illustrative water-soluble resins include polyethylene glycol and polyvinylpyrrolidone. Molecular weights for the water-soluble resins may be in a range of from 1000 g/mol to 10,000 g/mol. In embodiments, the water-soluble resin is polyethylene glycol having a molecular weight in a range of from 3000 g/mol to 9000 g/mol, from 3000 g/mol to 7000 g/mol, from 3000 g/mol to 5000 g/mol, or 4000 g/mol. These molecular weight values may be determined using gel permeation chromatography. In embodiments, the amount of the water-soluble resin is selected such that the total solids content (generally provided by the latex, the water-soluble resin, and the colorant) of the aqueous inkjet ink composition is from 5 weight % to 15 weight %, from 6 weight % to 12 weight %, or from 7 weight % to 10 weight %. (Here, weight % refers to the (total weight of solids)/(total weight of aqueous inkjet ink composition)*100.)

The aqueous inkjet ink composition may further comprise other binder resins including acrylic polymers such as styrene-acrylic copolymers and vinylpyrrolidone copolymers, urethane or polyurethane dispersions, and acrylic-urethane hybrid dispersions. More specific binder resins that can be used include those available from Johnson Polymers (BASF) such as Joncryl 661, Joncryl 8003, Joncryl 8078, Joncryl 8082, Joncryl 537, Joncryl H538, Joncryl H538, Joncryl including the name of HPD 71E. Other exemplary water-soluble resins include Rhoplex 1-1955, Rhoplex I-2426D, Rhoplex 1-62, Rhoplex 1-98, Rhoplex E-1691, available from Rhohm & Haas. Others include Lucidene 190, Lucidene 400, and Lucidene 243, available from DSM Corporation; NeoCryl A-1110, NeoCryl A-2092, NeoCryl A-639, NeoRad R-440, NeoRad R-441, NeoRez N-55 under the name 972, PVP K-15, PVP K-30, PVP K-60, PVP K-85, Ganex P-904LC, PVP/VA W-63 available from ISP. In embodiments, no such binder resins are used.

Colorant

The aqueous inkjet ink composition may comprise a colorant. Colorants include pigments, dyes, and combinations thereof. Examples of suitable dyes include anionic dyes, cationic dyes, nonionic dyes, and zwitterionic dyes. Specific examples of suitable dyes include Food dyes such as Food Black No. 1, Food Black No. 2, Food Red No. 40, Food Blue No. 1, Food Yellow No. 7, FD & C dyes, Acid Black dyes (No. 1, 7, 9, 24, 26, 48, 52, 58, 60, 61, 63, 92, 107, 109, 118, 119, 131, 140, 155, 156, 172, 194), Acid Red dyes (No. 1, 8, 32, 35, 37, 52, 57, 92, 115, 119, 154, 249, 254, 256), Acid Blue dyes (No. 1, 7, 9, 25, 40, 45, 62, 78, 80, 92, 102, 104, 113, 117, 127, 158, 175, 183, 193, 209), Acid Yellow dyes (No. 3, 7, 17, 19, 23, 25, 29, 38, 42, 49, 59, 61, 72, 73, 114, 128, 151), Direct Black dyes (No. 4, 14, 17, 22, 27, 38, 51, 112, 117, 154, 168), Direct Blue dyes (No. 1, 6, 8, 14, 15, 25, 71, 76, 78, 80, 86, 90, 106, 108, 123, 163, 165, 199, 226), Direct Red dyes (No. 1, 2, 16, 23, 24, 28, 39, 62, 72, 236), Direct Yellow dyes (No. 4, 11, 12, 27, 28, 33, 34, 39, 50, 58, 86, 100, 106, 107, 118, 127, 132, 142, 157), Reactive Dyes, such as Reactive Red Dyes (No. 4, 31, 56, 180), Reactive Black dyes (No. 31), Reactive Yellow dyes (No. 37); anthraquinone dyes, monoazo dyes, disazo dyes, phthalocyanine derivatives, including various phthalocyanine sulfonate salts, aza(18)annulenes, formazan copper complexes, and triphenodioxazines.

Examples of suitable pigments include black pigments, cyan pigments, magenta pigments, and yellow pigments. Pigments can be organic or inorganic particles. Suitable inorganic pigments include carbon black. However, other inorganic pigments may be suitable such as cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, and anthanthrone pigments such as PR168. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH® 1400, MONARCH® 1300, MONARCH® 1100, MONARCH® 1000, MONARCH® 900, MONARCH® 880, MONARCH® 800, MONARCH® 700, CAB-O-JET® 200, CAB-O-JET® 300, CAB-O-JET® 450, REGAL®, BLACK PEARLS®, ELFTEX®, MOGUL®, and VULCAN® pigments; Columbian pigments such as RAVEN® 5000, and RAVEN® 3500; Evonik pigments such as Color Black FW 200, FW 2, FW 2V, FW 1, FW18, FW 5160, FW 5170, Special Black 6, Special Black 5, Special Black 4A, Special Black 4, PRINTEX® U, PRINTEX® 140U, PRINTEX® V, and PRINTEX® 140V. Other pigments include CAB-O-JET 352K, CAB-O-JET 250C, CAB-O-JET 260M, CAB-O-JET 270Y, CAB-O-JET 465M, CAB-O-JET 470Y and CAB-O-JET 480V (available from Cabot Corporation).

The above list of pigments includes unmodified pigment particulates, small molecule attached pigment particulates, and polymer-dispersed pigment particulates.

In forming the aqueous inkjet ink compositions, the colorant(s) may be provided as a colorant dispersion comprising the colorant and a solvent (e.g., water). The colorant may be in the form of a particle and have an average particle size of from 20 nm to 500 nm, from 20 nm to 400 nm, or from 30 nm to 300 nm.

Various amounts of colorant may be used in the aqueous inkjet ink compositions. Generally, however, an amount is selected such that the total solids content (generally provided by the latex, the water-soluble resin, and the colorant) of the aqueous inkjet ink composition is from 5 weight % to about 15 weight %, from 6 weight % to 12 weight %, or from 7 weight % to 10 weight %. (Here, weight % refers to the (total weight of solids)/(total weight of aqueous inkjet ink composition)*100.)

Surfactant

Unlike the latex described above, the aqueous inkjet ink compositions may comprise one or more surfactants. Examples of suitable surfactants include anionic surfactants (such as sodium lauryl sulfate (SLS), Dextrol OC-40, Strodex PK 90, ammonium lauryl sulfate, potassium lauryl sulfate, sodium myreth sulfate and sodium dioctyl sulfosuccinate series), nonionic surfactants (Surfynol® 104 series, Surfynol® 400 series, Dynol™ 604, Dynol™ 607, Dynol™ 810, EnviroGem® 360, secondary alcohol ethoxylate series such as Tergitol™ 15-s-7, Tergitol™ 15-s-9, TMN-6, TMN-100x and Tergitol™ NP-9, Triton™ X-100, etc.) and cationic surfactants (Chemguard S-106A, Chemguard S-208M, Chemguard S-216M). Some fluorinated or silicone surfactants can be used such as PolyFox™ TMPF-136A, 156A, 151N, Chemguard S-'761p, S-'764p, Silsurf® A008, Siltec® C-408, BYK 345, 346, 347, 348 and 349, polyether siloxane copolymer TEGO® Wet-260, 270 500, etc. Some amphoteric fluorinated surfactants can also be used such as alkyl betaine fluorosurfactant or alkyl amine oxide fluorosurfactant such as Chemguard S-500 and Chemguard S-111.

Various amounts of surfactant may be used in the aqueous inkjet ink compositions. In embodiments, the surfactant is present in an amount in a range of from 0.01 weight % to 2 weight %. (Here, weight % refers to the (total weight of surfactant)/(total weight of aqueous inkjet ink composition)*100.) If more than one type of surfactant is used, these amounts refer to the total amount of surfactant.

Additives

Various additives may be used in the aqueous inkjet ink compositions to tune the properties thereof. Suitable additives include one or more of biocides; fungicides; stabilizers; pH controlling agents such as acids or bases, phosphate salts, carboxylates salts, sulfite salts, amine salts, buffer solutions; sequestering agents such as EDTA (ethylenediamine tetra acetic acid); defoamers; and wetting agents.

Various amounts of the additives may be used in the aqueous inkjet ink compositions. In embodiments, the additives are present in an amount in a range of from 0.01 weight % to 5 weight %. (Here, weight % refers to the (total weight of additives)/(total weight of aqueous inkjet ink composition)*100.) If more than one type of additive is used, these amounts refer to the total amount of additives.

In at least embodiments, the present aqueous inkjet ink compositions are free of (i.e., do not comprise) a coagulant and are free of (i.e., do not comprise) a coalescing agent and are free of (i.e., do not comprise) a plasticizer. In embodiments, the ink compositions are free of (i.e., do not comprise) any pyrrolidone-based solvents such as N-methylpyrrolidone, and are free of (i.e., do not comprise) Texanol and Texanol isobutyrate.

Similarly, the present aqueous inkjet ink compositions may be free of (i.e., do not comprise) a resin other than those provided by the present latexes. A single type of latex (including single type of resin particles) may be used.

In embodiments, the aqueous inkjet ink composition comprises (or consists of) a solvent system; resin particles; a colorant; and optionally, one or more of a water-soluble resin and an additive. In embodiments, the aqueous inkjet ink composition comprises (or consists of) a solvent system; resin particles; a colorant; a water-soluble resin; and optionally, an additive. In any of these embodiments, the additives may be selected from a stabilizer, a surfactant, a defoamer, a wetting agent, and a biocide. In any of these embodiments, the components may be selected from any of the solvent systems, resin particles, colorants, water-soluble resins, and additives disclosed herein. In any of these embodiments, amounts of the components may be used as described above. In any of these embodiments, a single type of resin particles may be used.

The aqueous inkjet ink compositions may be formed by combining the desired components at the desired amounts and mixing. An illustrative method comprises adding any of the disclosed latexes (or the resin particles) to a colorant dispersion to form a first mixture; and adding a second mixture comprising a solvent system and an additive(s) to the first mixture to form the aqueous inkjet ink composition. Mixing and/or heating may be used during the method. The aqueous inkjet ink composition may be filtered prior to use.

The aqueous inkjet ink compositions may be used to form printed images. In embodiments, such a method comprises ejecting droplets of any of the disclosed aqueous inkjet ink compositions onto a substrate to form an image thereon. Such a method may further comprise incorporating the ink composition into an inkjet printing apparatus. The printing apparatus may employ a thermal inkjet process wherein the ink composition in the nozzles is selectively heated in an imagewise pattern, thereby causing droplets of the ink composition to be ejected in imagewise pattern. Alternatively, the printing apparatus may employ an acoustic inkjet process wherein droplets of the ink composition are caused to be ejected in imagewise pattern by acoustic beams. In yet another embodiment, the printing apparatus may employ a piezoelectric inkjet process, wherein droplets of the ink composition are caused to be ejected in imagewise pattern by oscillations of piezoelectric vibrating elements. Any suitable substrate can be employed.

The method may comprise ejecting ink droplets in an imagewise pattern onto an intermediate transfer member, heating the image to partially or completely remove solvents, and transferring the ink composition in the imagewise pattern from the intermediate transfer member to a final recording substrate. The intermediate transfer member may be heated to a temperature above that of the final recording sheet and below that of the ink composition in the printing apparatus. An offset or indirect printing process is also disclosed in, for example, U.S. Pat. No. 5,389,958, the disclosure of which is totally incorporated herein by reference.

Any suitable substrate or recording sheet can be employed as the final recording sheet. Illustrative substrates include McCoy® Gloss #100 coated substrate, Xerox® Bold uncoated substrate, Kodak photo paper, Sterling® Ultra Web Matte (offset coated), TrueJet® Gloss Text (Inkjet treated coated), and McCoy® Silk (offset coated).

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Example 1 (Control)

A reactive surfactant solution of 3.2 grams (Hitenol BC1025 from Montello), 72 grams deionized water, and 0.8 g NaHCO$_3$ was prepared by mixing in a glass reactor. The reaction was then purged with nitrogen for 30 minutes. The reactor was then continuously purged with nitrogen while being stirred at 250 rpm. The reactor was then heated up to 85° C. and held there. Separately, 0.2 grams of ammonium persulfate (APS) initiator was dissolved in 5 grams of deionized water and added to the reactor.

Separately, a monomer emulsion was prepared in the following manner: 64 g of styrene, 10 g of butyl acrylate, 6 g of methacrylic acid, 1.2 g of 1-dodecanethiol (DDT), 0.24 g of PEGDA 250, 1.6 g of Hitenol BC 1025, and 30 g of deionized water were mixed with intermittent mixing to form an emulsion. The emulsified mixture was fed to the reactor slowly for 3 h and the reaction continued for 15 h.

A Malvern Nano-ZS was used to analyze the dimensions of the resin particles. The following parameters were observed: $D_{50}$=76 nm, and $D_{95}$=108 nm; width of peak=33 nm.

A Differential Scanning calorimetry (DSC) TA Instruments Discovery DSC 2500 was used to measure $T_g$. The $T_g$ of the latex was 76° C.

Example 2

In a 500 mL round bottom reactor, a reactive surfactant solution of 2.8 grams (Hitenol BC1025 from Montello), 72 grams deionized water, and 0.4 g NaHCO$_3$ was prepared with stirring at 250 rpm and continuously purging with nitrogen. The reactor was then heated up to 85° C. and held there. No initiator or initiator solution was added.

Separately, a monomer emulsion was prepared in the following manner: 62 g of styrene, 10 g of butyl acrylate, 6 g of methacrylic acid, 1.0 g of styrenesulfonic acid, 1.2 g of 1-dodecanethiol (DDT), 0.24 g of PEGDA 250, 1.36 g of Hitenol BC 1025, and 32 g of deionized water were mixed to form an emulsion.

9.1 g (8%) of the monomer emulsion was fed into the reactor slowly and then held for 1 to 5 minutes. Next, 10 g of an APS solution (0.5 g/mL) was fed over 1 minute and then held for 10 minutes. Next, the remainder of the monomer emulsion was fed into the reactor over 60 minutes. Next, the remainder (2-4 g) of the APS solution was fed into the reactor and then held at 1 hour. The temperature was raised from 85° C. to 90° C. and held for 3 hours.

A Malvern Nano-ZS was used to analyze the dimensions of the resin particles. The following parameters were observed: $D_{50}$=67 nm, and $D_{95}$=98 nm; width of peak=31 nm.

Example 3

The process of Example 2 was repeated with the following modification. After 9.1 g of the monomer emulsion was fed and then held for 1 to 5 minutes, 2 to 4 g of the APS solution was fed over 1 minutes and then held for 10 minutes. The remainder of the APS solution (10 g) was added during the feeding of the remainder of the monomer emulsion. Experiments were conducted in which the remainder of the APS solution was added either intermittently or continuously with the feeding of the remainder of the monomer emulsion.

Example 4

The process of Example 2 was repeated with the following modification. The monomer emulsion had the following components: 40 g of methyl methacrylate, 33 g of butyl acrylate, 6 g of methacrylic acid, 1.0 g of styrenesulfonic acid, 1.2 g of 1-dodecanethiol (DDT), 0.24 g of PEGDA 250, 1.36 g of Hitenol BC 1025, and 32 g of deionized water.

Example 5

The process of Example 2 was repeated with the following modification. The monomer emulsion had the following components: 41 g of methyl methacrylate, 25 g of butyl acrylate, 6 g of methacrylic acid, 1.0 g of styrenesulfonic acid, 1.2 g of 1-dodecanethiol (DDT), 0.24 g of PEGDA 250, 1.36 g of Hitenol BC 1025, 6 g of polyethylene glycol methacrylate 750 and 32 g of deionized water. The addition of the hydrophilic polyethylene glycol methacrylate improved the freeze-thaw stability of the latex (no precipitates were observed after 3 freeze-thaw cycles) as compared to Examples 1 and 2 (precipitates observed).

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

All numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method for forming a latex, the method comprising:
   (a) adding a first portion of a monomer emulsion comprising water, a monomer, an acidic monomer, a multifunctional monomer, and a first reactive surfactant to a reactive surfactant solution comprising water and a second reactive surfactant to form a reaction mixture, wherein the reactive surfactant solution does not comprise monomers other than the second reactive surfactant;
   (b) adding a first portion of an initiator solution to the reaction mixture so that monomers undergo polymerization reactions to form resin seeds in the reaction mixture;
   (c) adding a second portion of the monomer emulsion to the reaction mixture comprising the resin seeds; and
   (d) adding a second portion of the initiator solution to the reaction mixture of step b or the reaction mixture of step c to form a latex comprising resin particles.

2. The method of claim 1, wherein the reactive surfactant solution does not comprise the initiator.

3. The method of claim 1, wherein step (d) occurs after step (c).

4. The method of claim 1, wherein the addition of the second portion of the initiator solution is carried out during the addition of the second portion of the monomer emulsion.

5. The method of claim 1, wherein the monomer emulsion comprises styrene and an alkyl acrylate at a weight ratio of (styrene):(alkyl acrylate) of from about 10:1 to about 1:1.

6. The method of claim 1, wherein the monomer emulsion is free of styrene.

7. The method of claim 1, wherein the monomer emulsion comprises two different alkyl acrylates.

8. The method of claim 7, wherein the two different alkyl acrylates are methyl (meth)acrylate and butyl (meth)acrylate which are present at a weight ratio of (methyl (meth)acrylate):(butyl (meth)acrylate) of from about 5:1 to about 1:5.

9. The method of claim 1, wherein the monomer emulsion does not comprise a surfactant and the reactive surfactant solution does not comprise a surfactant.

10. The method of claim 1, wherein the monomer emulsion comprises styrene, an alkyl acrylate, methacrylic acid, a sulfonic acid monomer, a poly(ethylene glycol) diacrylate, and an anionic ether sulfate reactive surfactant.

11. The method of claim 10, wherein the sulfonic acid monomer is styrenesulfonic acid.

12. The method of claim 1, wherein the monomer emulsion comprises two different alkyl acrylates, methacrylic acid, a sulfonic acid monomer, a poly(ethylene glycol) diacrylate, and an anionic ether sulfate reactive surfactant.

13. The method of claim 12, wherein the sulfonic acid monomer is styrenesulfonic acid.

14. The method of claim 12, wherein the monomer emulsion further comprises a hydrophilic monomer.

15. The method of claim 14, wherein the hydrophilic monomer is a poly(ethylene glycol) methacrylate.

16. The method of claim 12, wherein the two different alkyl acrylates are methyl (meth)acrylate and butyl (meth)acrylate.

17. The method of claim 12, wherein the monomer emulsion is free of styrene.

18. The method of claim 1, wherein the resin particles have a $D_{50}$ particle size of no greater than about 100 nm, a $D_{95}$ particle size of less than about 150 nm, and a width of no greater than about 45 nm.

19. The method of claim 18, wherein the resin particles have a $D_{50}$ particle size of no greater than about 75 nm, a $D_{95}$ particle size of less than about 100 nm, and a width of no greater than about 35 nm.

* * * * *